March 7, 1933.  W. A. WHITING  1,900,145
PRECALKED EXTENSIBLE JOINT FOR PIPES
Filed April 1, 1930
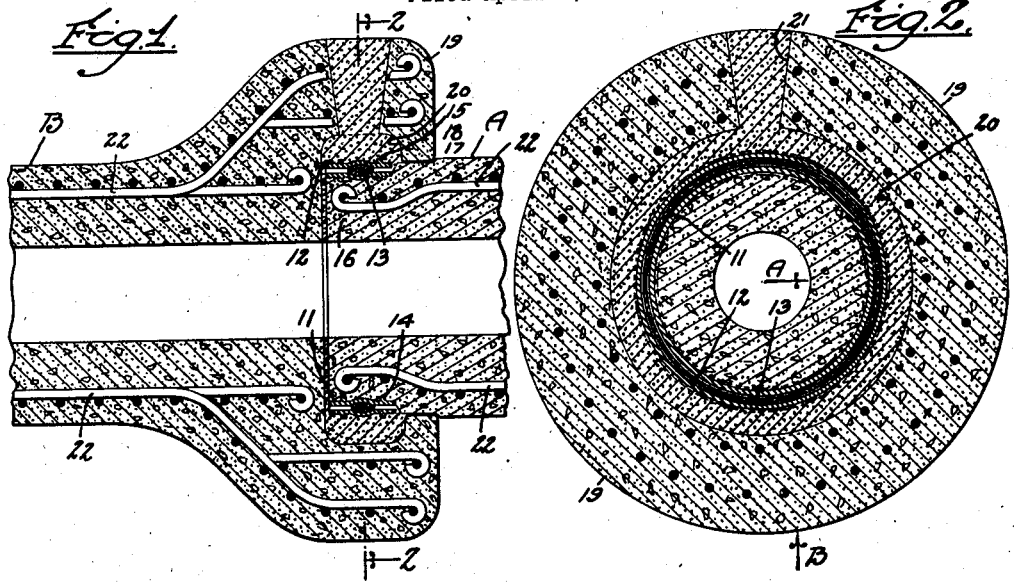
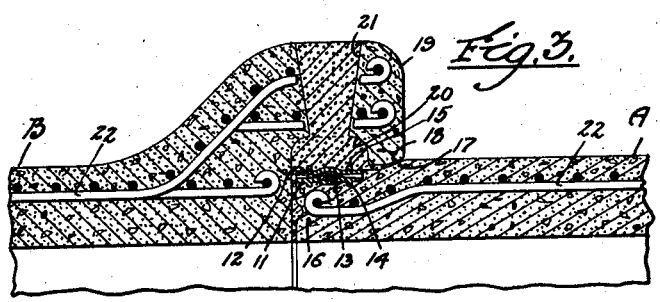
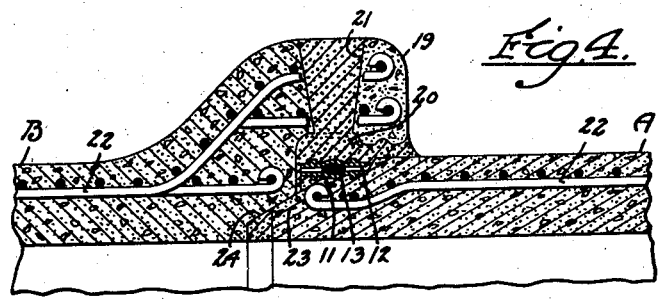
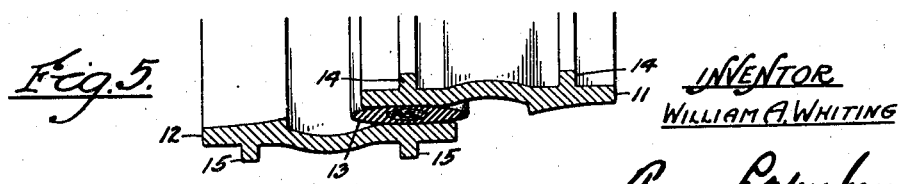
INVENTOR
WILLIAM A. WHITING
ATTORNEY Patented Mar. 7, 1933

1,900,145

UNITED STATES PATENT OFFICE

WILLIAM A. WHITING, OF HUNTINGTON PARK, CALIFORNIA, ASSIGNOR TO AMERICAN CONCRETE PIPE COMPANY, A CORPORATION OF DELAWARE

PRECALKED EXTENSIBLE JOINT FOR PIPES

Application filed April 1, 1930. Serial No. 440,715.

This invention relates to an extensible joint for use in installing pipe such as is used in water mains, irrigation systems, drainage systems, sewers, etc.

The primary object of this invention is to provide a joint for use in laying pipe of this nature that is characterized by having elements therein which permit longitudinal contraction and expansion of the pipe line, and maintain a water-tight seal at all times.

In practice, the use of pipe, such, for instance, as precast concrete pipe or steel pipe, introduces the objectionable feature of broken joints caused by expansion and contraction of the pipe. Accordingly, it becomes an object of this invention to provide a pipe joint adaptable for use with pipe which is provided with a flexible gasket that serves to seal the joint and permit relatively longitudinal movement between adjacent pipe sections.

The joint contemplated by this invention consists of a pair of concentric metallic rings with a flexible non-corrosive gasket inserted between said rings, one of said rings being secured to the end of a pipe section, and the other of said rings being left free for attachment to an adjoining pipe section. The flexible gasket is introduced between the concentric rings in such a manner that it will yield in response to relative lateral movement of the rings. The joint thus provided yields several advantages, amongst which may be included the following:

By providing a joint of this character upon a section of pipe, the joint may be tested for leakage in the shop before being sent to the job for installation, thus eliminating all possibility of leaky installation.

Furthermore, the use of a joint of this character prevents infiltration of roots into cracks or crevices in the pipe line, which eventually disrupt and interfere with water circulation.

The use of a joint of this character also provides a water-tight joint that does not leak after continued expansion and contraction of the pipe line.

A noteworthy feature of this invention is the provision of self-centering means for laying consecutive joints. This feature is an integral part of the pipe, and also operates to advantage in providing a means of forming a solid column of pipe for forcing the sections to travel during expansion, thus relieving the flexible gasket of destructive pressure.

It is another object of this invention to provide a precalked joint in a precast pipe, lending itself particularly to economy of manufacture and the formation of a completely tested fluid sealing means within the factory before being sent to the job.

Other objects and advantages will appear as the description proceeds in connection with the drawing, in which—

Fig. 1 is a longitudinal section showing one type of my joint;

Fig. 2 is a section on line 2—2 of Fig. 1;

Fig. 3 is an enlarged fragmentary view showing the details of my joint;

Fig. 4 is an enlarged fragmentary view showing another form of my joint; and

Fig. 5 is a fragmentary view showing one method of forming the joint in the factory.

In the drawing illustrating my invention, I have shown a section of pipe A joined to a section of pipe B, the manner of joining involving my invention.

Referring now to Fig. 3, the joint utilized in joining the sections A and B may be further described as comprising suitable non-corrosive rings 11 and 12 mounted upon the spigot end of the pipe A. Interposed between the rings 11 and 12 is a suitable gasket 13 arranged to form a seal between the rings 11 and 12, which are concentrically related. As shown, the rings 11 and 12 are each provided with lugs or ribs 14 and 15, respectively, which are arranged in a manner to form a bond between the rings and the pipe sections. The ring 11 is mounted upon a reduced end portion 16 of the pipe section A, and the lugs 14 form a bond therewith.

Although this description will be directed to the embodiment of my invention with concrete pipe, nevertheless I make mention that it may be employed equally as well with steel pipe or with tile pipe.

In making precast concrete pipe, it is a comparatively simple matter to mount a ring, such as 11, upon a reduced end of the pipe section. After the pipe section has sufficiently set with the ring 11 in place, the ring 12 may be pressed on in the manner shown in Fig. 5, or the rings 11 and 12 with the gasket 13 interposed therebetween may be mounted as a unit at the time of casting the pipe section A. Attention is called to the shoulder 17 on the spigot end of the pipe section A, which engages a shoulder 18 on the belled end of the section B. These shoulders co-operate to center the section A in the belled end 19 of the section B, and, in laying up the joints, it is the usual practice to coat these shoulders with cement mortar before pushing the joints together. This structure will also be appreciated as providing a continuous abutting contact throughout the pipe line whereby, when the pipe expands, it expands against a continuous line of pipe sections. The belled end 19 of the pipe section B is formed with an internal annular recess 20, which is substantially of equal width with the length of the ring 12. The recess 20 is provided with an opening 21 for introducing a sealing compound into the joint. Such a compound may be a mastic compound suitable for flowing around and into the crevices provided in the joint, and effecting a water seal in all parts of the joint. The sections A and B may be provided with suitable reinforcements such as shown at 22.

In the joint shown in Fig. 4, I have illustrated another form of my invention in which the self-centering means is transferred from the belled end to the spigot end of the pipe.

In this view, the section A is equipped with an extending section 23 which extends into an annular recess 24 within the section B. In this arrangement, the means of sealing the joint and the same form of my invention involving the concentric rings and the flexible gasket is embodied in identically the same manner as described with relation to Fig. 3.

In Fig. 5, I have somewhat diagrammatically shown a way of assembling the concentric rings with the gasket mounted between. It is to be understood that the rings may be assembled in this manner after one of the rings has been cast upon a joint, or that the rings may be assembled in this manner and then cast upon the end of a joint, and it also might be stated that the rings, instead of being mounted upon the spigot end of a pipe section, may be mounted upon the belled end of a pipe, and my invention is intended to include all such arrangements and adaptations of the concentric rings having a flexible gasket therebetween. The nature of the gasket contemplated by this invention may be characterized by having suitable flexibility to permit a rolling between the two rings. For this purpose, it may be a soft lead gasket or a lead gasket having a fiber core, or it may be of any suitable flexible metal or material having non-corrosive properties. The rings themselves are also characterized by being formed of suitable non-corrosive material. A joint of this nature will be appreciated as providing a water-tight joint in which elements are arranged to permit relative longitudinal movement of the adjacent pipe section and a joint in which the deterioration is practically nil. In installing joints of this character, no calking, and, consequently, no preparation for calking is required, neither is it necessary to make preparation for retaining the plastic sealing material within the joint. In this respect, attention is directed to the shoulders 17 and 18 which form a perfect seal for mastic sealing material which is introduced through the passage 21.

In practice, the joints would be assembled with the openings 21 extending upwardly and the shoulders 17 and 18 closely abutting, and the plastic sealing material would be introduced into the joints and would flow around the annular recess 20, thereby forming a perfect bond between the plastic material and the ring 12 by means of the lugs or ribs 15.

It is a noteworthy feature of my invention that the concentric rings are equally efficient when used in conjunction with a male and female pipe joint or a tongue and groove arrangement instead of a spigot and belled-end pipe section.

Although I have shown my invention as embodied in precast concrete pipe, nevertheless I am aware that other adaptations may be made. Consequently, it is my intention to include all such adaptations and modifications of my invention that come within the scope of the specification and the purview of the appended claims.

I claim as my invention:

1. In a pipe joint of the character described: a pair of concentric rings mounted upon a pipe section; a flexible gasket interposed between said rings; and means on said rings for effecting a bond between said rings and said pipe section.

2. In combination with a section of pipe: a ring secured to one end thereof; a flexible gasket mounted on said ring; and a second ring concentrically mounted on said gasket and adapted for attaching to a second section of pipe.

3. In combination with a section of pipe: a ring secured to one end thereof; a flexible gasket mounted on said ring; a second ring concentrically mounted on said gasket and adapted for attaching a second section of pipe; and means for effecting a bond between said rings and said pipe sections.

4. In combination with a belled end of a pipe section: a spigot end of a pipe section having preformed means thereon for forming an extensible joint between said sections;

separate means for centering said spigot end in said belled end, and means for bonding said preformed means to said belled end of the other pipe section.

5. In combination with a belled end of a pipe section: a spigot end of a pipe section having preformed means thereon for forming an extensible joint between said sections; and separate means for centering said spigot end in said belled end, said last mentioned means comprising cooperating shoulders on said spigot end and said belled end, respectively.

6. For use in joining pipe: a pipe section having a precalked joining means bonded on one end thereof, said means comprising concentrically mounted rings axially movable with respect to each other and a flexible gasket therebetween.

7. In combination: a belled end pipe section; a spigot end pipe section; a precalked joining means bonded to said spigot end and adapted to freely enter said belled end, said joining means embodying a ring mounted on said spigot end; a flexible gasket concentrically mounted on said ring; a second ring concentrically mounted on said gasket; and means for bonding said second ring with said belled end.

8. In combination: a belled end pipe section; a spigot end pipe section; a precalked joining means bonded to said spigot end and adapted to freely enter said belled end, said joining means embodying a ring mounted on said spigot end; a flexible gasket concentrically mounted on said ring; a second ring concentrically mounted on said gasket; and means for admitting a plastic sealing material through said belled end to bond said second ring with said belled end.

9. In combination: a belled end pipe section; a spigot end pipe section; a precalked joining means bonded to said spigot end and adapted to freely enter said belled end, said joining means embodying a ring mounted on said spigot end; a flexible gasket concentrically mounted on said ring; a second ring concentrically mounted on said gasket; means for centering said spigot end and said belled end; and means for bonding said second ring with said belled end.

10. For use in joining pipe: a pipe section having a precalked joining means bonded on one end thereof, said means comprising concentrically mounted rings with a flexible gasket therebetween; and the outer ring being adaptable for bonding with a contiguous pipe section.

In testimony whereof, I have hereunto set my hand at Los Angeles, California, this 21st day of March, 1930.

WILLIAM A. WHITING.